United States Patent Office 3,448,106
Patented June 3, 1969

3,448,106
NOVEL 2-AMINO-BENZYLAMINES AND SALTS THEREOF
Josef Nickl, Johannes Keck, and Robert Engelhorn, Biberach an der Riss, Germany, assignors to Boehringer Ingelheim G.m.b.H., Ingelheim am Rhine, Germany, a corporation of Germany
No Drawing. Filed Mar. 31, 1966, Ser. No. 538,965
Claims priority, application Germany, Apr. 9, 1965, T 28,357
Int. Cl. C07d 87/26, 11/00, 51/66
U.S. Cl. 260—247.5                     5 Claims

ABSTRACT OF THE DISCLOSURE

The compounds are 2-amino-benzylamines and non-toxic acid addition salts thereof, useful as secretolytics and antitussives in warm-blooded animals.

---

This invention relates to novel 2-amino-benzylamines and acid addition salts thereof, as well as to various methods of preparing these compounds.

More particularly, the present invention relates to a novel class of 2-amino-benzylamines of the formula

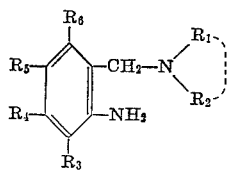

(I)

wherein:

$R_1$ is lower alkyl, lower alkoxy-lower alkyl or cycloalkyl,
$R_2$ is hydrogen or lower alkyl,
$R_1$ and $R_2$, together with each other and the nitrogen atom to which they are attached, form a saturated 5- to 6-membered basic heterocyclic ring which may be interrupted by an additional heteroatom and/or may have a lower alkyl substituent attached to one of the ring atoms, and any adjacent two of substituents $R_3$ through $R_6$ are lower alkoxy or, together with each other, methylenedioxy and the remainder are hydrogen or lower alkoxy, and their non-toxic, pharmacologically acceptable acid addition salts formed with an inorganic or organic acid.

The compounds according to the present invention may be prepared by a variety of methods involving well known chemical principles, but among these the following have proved to be especially convenient and efficient:

Method A

By subjecting a 2-nitro-benzylamine of the formula

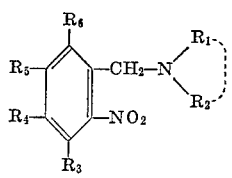

(II)

wherein $R_1$ through $R_6$ have the same meanings as in Formula I, to a reduction reaction.

The reduction may be effected according to customary methods; for instance, with catalytically activated hydrogen in the presence of a noble metal catalyst, such as platinum or palladium, or in the presence of Raney nickel, preferably in an inert organic solvent, such as methanol, ethanol, tetrahydrofuran or dioxane; or with a mixture of hydrazine hydrate and Raney nickel, preferably in an inert organic solvent, such as methanol or dioxane; or with nascent hydrogen generated, for example, from a mixture of iron, zinc or tin and a mineral acid; or with the aid of an aqueous suspension of sodium dithionite at room temperature or at moderately elevated temperatures.

The 2-nitro-benzylamines II used as starting materials in this method may be obtained in customary fashion; for instance, by nitration of the corresponding benzylamines, unsubstituted in the 2-position, with concentrated nitric acid, or by reacting a correspondingly ring-substituted 2-nitro-benzylester of a strong mineral acid, such as hydrochloric acid or nitric acid, with a secondary amine of the formula

where $R_1$ and $R_2$ have the same meanings as in Formula I. Using either of these methods, the following 2-nitro-benzylamines were obtained:

(a) N-(2-nitro-4,5-methylenedioxy - benzyl) - diethyl - amine; M.P. 54° C.
(b) N-(2-nitro-4,5-methylenedioxy - benzyl)-n-propylamine; M.P. 47–49° C.
(c) N-(2-nitro-4,5-methylenedioxy-benzyl) - morpholine; M.P. 78–79° C.
(d) N-(2-nitro-4,5-dimethoxy-benzyl)-piperidine; M.P. 98–100° C.
(e) N-(2-nitro-3,4,5-trimethoxy-benzyl)-diethylamine; M.P. 42–44° C.
(f) N-(2-nitro - 4,5,6 - trimethoxy-benzyl)-piperidine; M.P. 164–166° C.
(g) N-(2-nitro-4,5,6-trimethoxy - benzyl)-morpholine; M.P. 175–176° C.
(h) N-(2-nitro - 3,5 - dimethoxy - benzyl)-ethylamine; M.P. 63–64° C.

Method B

By subjecting a 2-amino-benzaldehyde of the formula

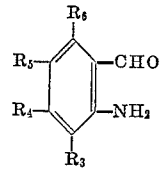

(III)

wherein $R_3$ through $R_6$ have the same meanings as in Formula I, to a reductive amination reaction with a secondary amine of the formula

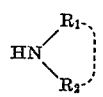

(IV)

wherein $R_1$ and $R_2$ have the same meanings as in Formula I, and with catalytically activated hydrogen in the presence of a noble metal catalyst, such as platinum or palladium, or in the presence of Raney nickel, at room temperature or moderately elevated temperatures in an inert organic solvent, such as methanol, ethanol or dioxane. This method is particularly suitable for the preparation of those compounds of the Formula I wherein $R_2$ is hydrogen.

The 2-amino-benzaldehydes III used as starting materials in this method are well known and are fully described in the literature.

Method C

By subjecting a 2-amino-benzamide of the formula

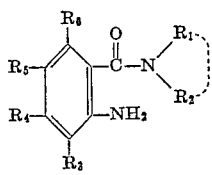

(V)

wherein $R_1$ through $R_6$ have the same meanings as in Formula I, to a reducing reaction pursuant to known methods. The best yields are obtained by reducing Compound V with a complex metal hydride, especially with lithium aluminum hydride. The reducing reaction is most advantageously carried out in an anhydrous inert organic solvent, such as ether or tetrahydrofuran, at moderately elevated temperatures, such as at the boiling point of the particular solvent which is employed.

The 2-amino-benzamides V used as starting materials in this method may be obtained pursuant to known methods; for instance, by reacting a corresponding 2-nitro-benzoyl chloride of the formula

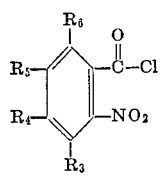

wherein $R_3$ through $R_6$ have the same meanings as in Formula I, with a secondary amine of the Formula IV above, and subsequently reducing the 2-nitro-benzamide thus obtained with catalytically activated hydrogen in the presence of a noble metal catalyst.

Another convenient method of preparing starting Compounds V is by reacting a benzoxazine-(3,1)-dione-(2,4) of the formula

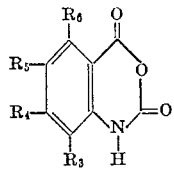

wherein $R_3$ through $R_6$ have the same meanings as in Formula I, with a secondary amine of the Formula IV above at room temperature.

Using either of these methods, the following 2-amino-benzamides V were prepared:

(a) N - (2 - amino-3,5-dimethoxy-benzoyl)-morpholine; M.P. 111–113° C.

(b) N - (2-amino-4,5-methylenedioxy-benzoyl)-piperidine; M.P. 110–111° C.

(c) N - (2 - amino-3,5-dimethoxy-benzoyl)-N-methyl-cyclohexylamine; M.P. 107° C.

(d) N - (2-amino-3,5-dimethoxy-benzoyl)-piperidine; M.P. 180° C.

The 2-amino-benzylamines of the Formula I obtained by Methods A, B and C above are basic compounds and therefore form acid addition salts with inorganic or organic acids. More particularly, they form non-toxic, pharmacologically acceptable acid addition salts with inorganic and organic acids. Examples of such non-toxic acid addition salts include, but are not limited to, those formed with hydrochloric acid, hydrobromic acid, sulfuric acid, phosphoric acid, oxalic acid, succinic acid, tartaric acid, citric acid, maleic acid, fumaric acid, 8-chlorotheophylline and the like.

The non-toxic, pharmacologically acceptable acid addition salts of compounds of the Formula I are most conveniently obtained by dissolving the free base I in a suitable inert solvent, andacidifying the solution with the desired inorganic or organic acid.

The following examples further illustrate the present invention and will enable others skilled in the art to understand it more completely. It should be understood, however, that the invention is not limited to the particular examples given below.

EXAMPLE 1

Preparation of N-(2-amino-4,5-methylenedioxy-benzyl)-diethylamine by Method A

A solution of 13.2 gm. of N-(2-nitro-4,5-methylenedioxy-benzyl)-diethylamine in 50 cc. of dioxane and 30 cc. of aqueous 80% hydrazine hydrate were simultaneously added dropwise, while stirring, to a suspension of 5 gm. of Raney nickel in dioxane. After the initially vigorous reaction had subsided, the reaction mixture was heated for one hour to allow the reaction to go to completion. Thereafter, the catalyst was filtered off, the filtrate was evaporated in vacuo, the residue was taken up in ether, the resulting solution was washed with water and filtered through aluminum oxide, evaporated in vacuo and finally distilled in vacuo. 8.5 gm. (75% of theory) of a compound having a boiling point of 125–130° C. at 0.2 mm. Hg were obtained. It was identified to be N-(2-amino-4,5-methylenedioxy-benzyl)-diethylamine of the formula

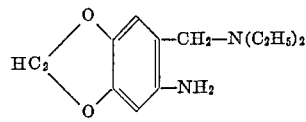

EXAMPLE 2

Preparation of N-(2-amino-4,5-methylenedioxy-benzyl)-n-propylamine by Method A 60 cc. of aqueous 80% hydrazine hydrate and a solution of 21 gm. of N-(2-nitro-4,5-methylenedioxy-benzyl)-n-propylamine in 100 cc. of dioxane were simultaneously added dropwise to a suspension of 3 gm. of Raney nickel in 50 cc. of dioxane at a rate such that vigorous boiling of the reaction mixture was maintained. After all of the reactants had been admixed, the reaction mixture was boiled for half an hour, the catalyst was filtered off, and the filtrate was evaporated in vacuo. The residue was shaken with a mixture of water and ether, and the ether phase was separated, dried and evaporated. The residue was distilled in a vacuum of 0.22 mm. Hg, yielding 11.5 gm. (63% of theory) of a compound having a boiling point of 136–138° C. at 0.22 mm. Hg. It was identified to be N-(2-amino-4,5-methylenedioxy-benzyl)-n-propylamine of the formula

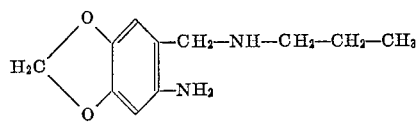

EXAMPLE 3

Preparation of N-(2-amino-4,5-dimethoxy-benzyl)-isopropylamine by Method A 14 gm. of N-(2-nitro-4,5-dimethoxy-benzyl)-isopropylamine were dissolved in 120 cc. of methanol, and the resulting solution was catalytically hydrogenated in the presence of Raney nickel. After 95% of the calculated amount of hydrogen had been consumed, the hydrogenation had gone to completion and was terminated. The catalyst was then filtered off, and the filtrate was evaporated to dryness. The residue was recrystallized from petroleum ether, yielding 8.5 gm. (70% of theory) of a compound having a melting point of 76–77° C. It was identified to be N-(2-amino-4,5-dimethoxy-benzyl)-isopropylamine of the formula

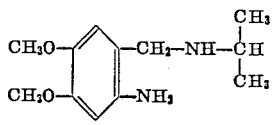

EXAMPLE 4

Preparation of N-(2-amino-4,5,6-trimethoxy-benzyl)-piperidine and its dihydrochloride by Method A 9.7 gm. of N-(2-nitro-4,5,6-trimethoxy-benzyl)-piperidine hydrochloride were dissolved in water, and the resulting solution was introduced into an aqueous suspension of 25 gm. of sodium dithionite. The reaction mixture was heated for thirty minutes at 40° C., then made strongly alkaline with sodium hydroxide, and extracted with chloroform. The chloroform extract solution was washed with water, evaporated, and the residue, N-(2-amino-4,5,6-trimethoxy-benzyl)-piperidine, was taken up in ether. Gaseous hydrogen chloride was introduced into the ether solution, whereby a precipitate formed, which was isolated. 4.5 gm. (45.5% of theory) of a compound having a melting point of 174° C. were obtained. It was identified to be N-(2-amino-4,5,6-trimethoxy-benzyl)-piperidine dihydrochloride of the formula

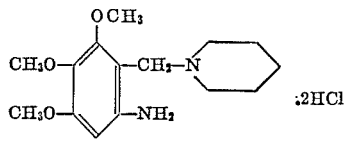

EXAMPLE 5

Preparation of N-(2-amino-4,5-methylenedioxy-benzyl)-ethylamine by Method B

A solution of 5 gm. of 2-amino-4,5-methylene-dioxy-benzaldehyde in methanol was admixed with a solution of a molar excess of ethylamine in methanol. The resulting reaction mixture was allowed to stand at room temperature overnight and was then hydrogenated in the presence of Raney nickel as a catalyst. After the calculated amount of hydrogen had been absorbed the hydrogenation was terminated, the catalyst was filtered off, the filtrate was evaporated, and the residue was taken up in ether. The ethereal solution was washed with water, filtered through aluminum oxide, the filtrate was evaporated, and the residue was distilled in vacuo. 1 gm. of a compound having a boiling point of 110–115° C. at 0.1 mm. Hg was obtained; it crystallized upon standing and then had a melting point of 58° C. It was identified to be N-(2-amino-4,5-methylenedioxy-benzyl)-ethylamine of the formula

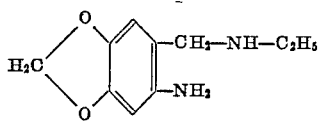

EXAMPLE 6

Preparation of N-(2-amino-3,5-dimethoxy-benzyl)-N-methylcyclohexylamine and its dihydrochloride by Method C 4.7 gm. of N-(2-amino-3,5-dimethoxy-benzoyl)-N-methyl-cychlohexylamine were dissolved in 150 cc. of absolute ether, the solution was admixed with 332 gm. of lithium aluminum hydride, and the mixture was boiled for 20 hours. Thereafter, the reaction mixture was worked up in customary fashion, yielding an oily substance which was identified to be N-(2-amino-3,5-dimethoxy-benzyl)-N-methylcyclohexylamine. The oil was dissolved in ether, the ethereal solution was acidified with ethereal hydrochloric acid, and the precipitate formed thereby was recrystallized from butanol. 2.4 gm. (48% of theory) of a compound having a melting point of 200° C. were obtained. It was identified to be N-(2-amino-3,5-dimethoxy-benzyl)-N-methyl-cyclohexylamine dihydrochloride of the formula

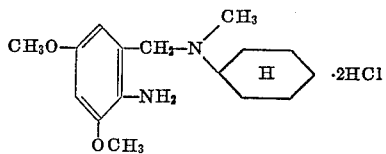

EXAMPLE 7

Using a procedure analogous to that described in Example 1, N-(2-amino-4,5-methylenedioxy-benzyl)methylamine, B.P. 136–138° C. at 1.5 mm. Hg, of the formula

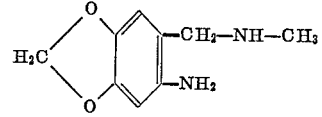

was prepared from N-(2-nitro-4,5-methylenedioxy-benzyl)-methylamine (M.P. 68° C.). The yield was 40% of theory.

EXAMPLE 8

Using a procedure analogous to that described in Example 1, N - (2-amino-4,5-methylenedioxy-benzyl)-ethylamine, M.P. 58° C., of the formula

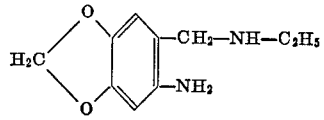

was prepared from N-(2-nitro-4,5-methylenedioxy-benzyl)-ethylamine (M.P. hydrochloride 230° C.). The yield was 80% of theory.

EXAMPLE 9

Using a procedure analogous to that described in Example 1, N-(2-amino-4,5-methylenedioxy-benzyl)-n-propylamine, B.P. 136–138° C. at 0.22 mm. Hg, of the formula

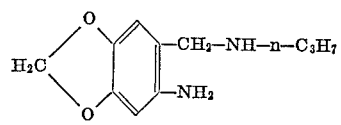

was prepared from N-(2-nitro-4,5-methylenedioxy-benzyl)-n-propylamine (M.P. 49° C.). The yield was 63% of theory.

EXAMPLE 10

Using a procedure analogous to that described in Example 1, N-(2-amino-4,5-methylenedioxy-benzyl)-isopropylamine, B.P. 133° C. at 0.6 mm. Hg, of the formula

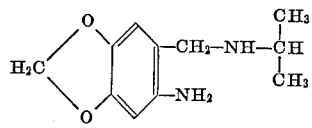

was prepared from N-(2-nitro-4,5-methylenedioxy-benzyl)-isopropylamine (M.P. hydrochloride 254° C.). The yield was 65% of theory.

EXAMPLE 11

Using a procedure analogous to that described in Example 1, N - (2 - amino-4,5-methylenedioxy-benzyl)-n-butylamine, B.P. 132° C. at 0.04 mm. Hg, of the formula

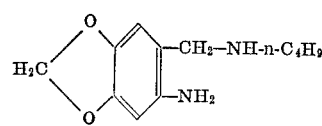

was prepared from N-(2-nitro-4,5-methylenedioxy-benzyl) - n-butylamine (M.P. hydrochloride 191° C.). The yield was 76% of theory.

EXAMPLE 12

Using a procedure analogous to that described in Example 1, N - (2 - amino-4,5-methylenedioxy-benzyl)-sec. butylamine, B.P. 123° C. at 0.06 mm. Hg, was prepared from N - (2-nitro-4,5,-methylenedioxyl-benzyl)-sec.butylamine (M.P. hydrochloride 210° C.). The yield was 72% of theory.

EXAMPLE 13

Using a procedure analogous to that described in Example 1, N - (2-amino-4,5-methylenedioxy-benzyl)-isobutylamine, M.P. 53° C., was prepared from N-(2-nitro-4,5 - methylenedioxy-benzyl)isobutylamine (M.P. hydrochloride 191° C.). The yield was 76% of theory.

EXAMPLE 14

Using a procedure analogous to that described in Example 1, N-(2-amino-4,5-methylenedioxy-benzyl)-tert. butylamine, M.P. 70° C., was prepared from N-(2-nitro-4,5-methylenedioxy-benzyl)-tert.butylamine (M.P. hydrochloride 286° C.). The yield was 56% of theory.

EXAMPLE 15

Using a procedure analogous to that described in Example 1, N - (2 - amino-4,5-methylenedioxy-benzyl)-β-methoxyethylamine, B.P. 140° C. at 0.2 mm. Hg, of the formula

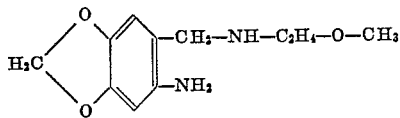

was prepared from N-(2-nitro-4,5-methylenedioxy-benzyl) - β-methoxyethyl-amine (M.P. hydrochloride 163° C.). The yield was 40% of theory.

EXAMPLE 16

Using a procedure analogous to that described in Example 1, N - (2 - amino-4,5-methylenedioxy-benzyl)-dimethylamine, B.P. 103° C. at 0.2 mm. Hg, of the formula

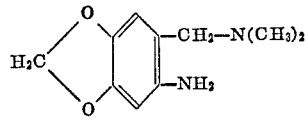

was prepared from N-(2-nitro-4,5-methylenedioxy-benzyl)-dimethylamine (M.P. 54° C.). The yield was 83% of theory.

EXAMPLE 17

Using a procedure analogous to that described in Example 1, N - (2-amino-4,5-methylenedioxybenzyl)-N-ethyl-cyclohexylamine, M.P. 80° C., of the formula

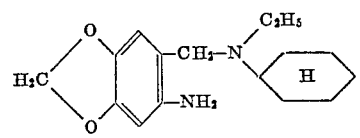

was prepared from N - (2-nitro-4,5-methylenedioxy-benzyl)-N-ethyl-cyclohexylamine (M.P. 74° C.). The yield was 49% of theory.

EXAMPLE 18

Using a procedure analogous to that described in Example 1, N - (2-amino-4,5-methylenedioxy-benzyl)pyrrolidine, M.P. 50° C., of the formula

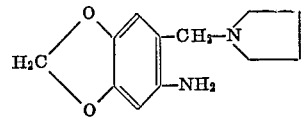

was prepared from N-(2-nitro-4,5-methylenedioxy-benzyl)pyrrolidine (M.P. 95° C.). The yield was 73% of theory.

EXAMPLE 19

Using a procedure analogous to that described in Example 1, N-(2-amino-4,5-methylenedioxy-benzyl)-morpholine, M.P. 80° C., of the formula

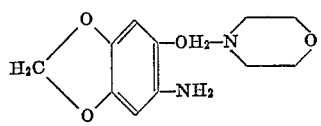

was prepared from N-(2-nitro-4,5-methylenedioxy-benzyl)-morpholine (M.P. 79° C.). The yield was 80% of theory.

EXAMPLE 20

Using a procedure analogous to that described in Example 1, N-(2-amino-4,5-methylenedioxy-benzyl)-piperidine, M.P. 74° C., of the formula

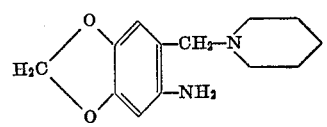

was prepared from N - (2 - nitro-4,5 - methylenedioxy-benzyl)-piperidine (M.P. 74° C.). The yield was 44% of theory.

EXAMPLE 21

Using a procedure analogous to that described in Example 1, N-(2-amino-4,5-methylenedioxy-benzyl)-N'-methyl-piperazine, M.P. 87° C., of the formula

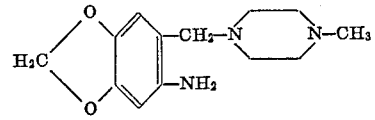

was prepared from N-(2-nitro-4,5-methylenedioxy-benzyl)-N'-methyl-piperazine (M.P. hydrochloride 219° C.). The yield was 32% of theory.

EXAMPLE 22

Using a procedure analogous to that described in Example 3, N-(2-amino-4,5-dimethoxy-benzyl)-ethylamine dihydrochloride, M.P. 90° C., of the formula

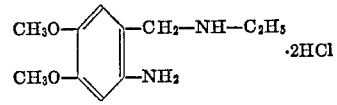

was prepared from N-(2-nitro-4,5-dimethoxy-benzyl)-ethylamine (M.P. 76° C.). The yield was 42% of theory.

EXAMPLE 23

Using a procedure analogous to that described in Example 3, N-(2-amino-4,5-dimethoxy-benzyl)-n-propylamine dihydrochloride, M.P. 187° C., of the formula

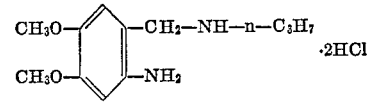

was prepared from N-(2-nitro-4,5-dimethoxy-benzyl)-n-propylamine (M.P. hydrochloride 187° C.). The yield was 68% of theory.

EXAMPLE 24

Using a procedure analogous to that described in Example 3, N-(2-amino-4,5-dimethoxy-benzyl)-n-butylamine, B.P. 150° C. at 0.05 mm. Hg, of the formula

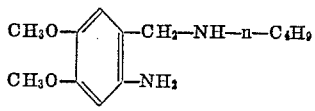

was prepared from N-(2-nitro-4,5-dimethoxy-benzyl)-n-butylamine (M.P. hydrochloride 168° C.). The yield was 38% of theory.

EXAMPLE 25

Using a procedure analogous to that described in Example 3, N-(2-amino-4,5-dimethoxy-benzyl)-sec. butylamine, M.P. 61° C., was prepared from N-(2-nitro-4,5-dimethoxy-benzyl)sec. butylamine (M.P. hydrochloride 190° C.). The yield was 57% of theory.

EXAMPLE 26

Using a procedure analogous to that described in Example 3, N-(2-amino-4,5-dimethoxy-benzyl) - isobutylamine, B.P. 131° C. at 0.05 mm. Hg, was prepared from N-(2-nitro-4,5-dimethoxy-benzyl) - isobutylamine (M.P. 187° C.). The yield was 28% of theory.

EXAMPLE 27

Using a procedure analogous to that described in Example 3, N-(2-amino-4,5-dimethoxy-benzyl)-tert. butylamine, M.P. 98° C., was prepared from N-(2-nitro-4,5-dimethoxy-benzyl)-tert. butylamine (M.P. 80° C.). The yield was 70% of theory.

EXAMPLE 28

Using a procedure analogous to that described in Example 3, N - (2-amino-4,5-dimethoxy-benzyl)-N-ethyl-cyclohexylamine dihydrochloride, M.P. 180 C., of the formula

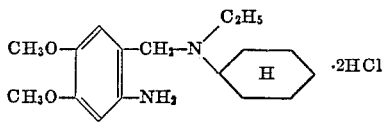

was prepared from N-(2-nitro-4,5-dimethoxy-benzyl)-n-ethyl-cyclohexylamine (M.P. hydrochloride 202° C.). The yield was 69% of theory.

EXAMPLE 29

Using a procedure analogous to that described in Example 3, N-(2-amino-4,5-dimethoxy-benzyl)-piperidine dihydrochloride, M.P. 197° C., of the formula

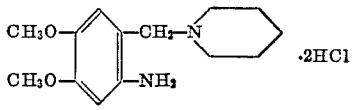

was prepared from N-(2-nitro-4,5-dimethoxy-benzyl)-piperidine (M.P. 100° C.). The yield was 68% of theory.

EXAMPLE 30

Using a procedure analogous to that described in Example 1, N-(2-amino-3,5-dimethoxy-benzyl)-ethylamine oxalate, M.P. 180° C., was prepared from N-(2-nitro-3,5-dimethoxy-benzyl)-ethylamine (M.P. 64° C.). The yield was 49% of theory.

EXAMPLE 31

Using a procedure analogous to that described in Example 1, N-(2-amino-3,5-dimethoxy-benzyl)-n-propylamine oxalate, M.P. 180° C., was prepared from N-(2-nitro-3,5-dimethoxy-benzyl)-n-propylamine (M.P. hydrochloride 189° C.). The yield was 66% of theory.

EXAMPLE 32

Using a procedure analogous to that described in Example 4, N-(2-amino-4,5,6-trimethoxy-benzyl)-ethylamine oxalate, M.P. 173° C., of the formula

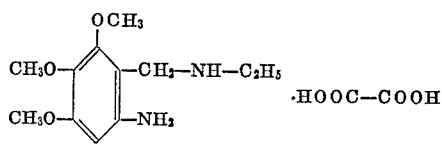

was prepared from N-(2-nitro-4,5,6-trimethoxy-benzyl)-ethylamine hydrochloride (M.P. 163° C.). The yield was 24% of theory.

EXAMPLE 33

Using a procedure analogous to that described in Example 4, N-(2-amino-4,5,6-trimethoxy - benzyl)-morpholine dihydrochloride, M.P. 183° C., of the formula

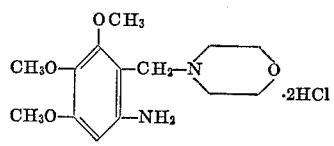

was prepared from N-(2-nitro-4,5,6-trimethoxy-benzyl)-morpholine hydrochloride (M.P. 175° C.). The yield was 15% of theory.

EXAMPLE 34

Using a procedure analogous to that described in Example 1, N-(2-amino-3,4,5-trimethoxy-benzyl)-ethylamine. B.P. 140° C. at 0.8 mm. Hg, of the formula

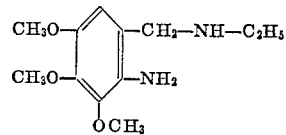

was prepared from N-(2-nitro-3,4,5-trimethoxy - benzyl)-ethylamine (M.P. hydrochloride 206° C.). The yield was 38% of theory.

EXAMPLE 35

Using a procedure analogous to that described in Example 4, N-(2-amino-3,4,5-trimethoxy-benzyl)-isopropylamine dihydrochloride, M.P. 192° C., of the formula

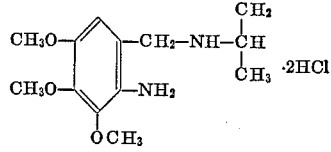

was prepared from N-(2-nitro-3,4,5-trimethoxy-benzyl)-isopropylamine hydrochloride (M.P. 166° C.).

EXAMPLE 36

Using a procedure analogous to that described in Example 6, N-(2-amino-3,5-dimethoxy-benzyl) piperidine oxalate, M.P. 147° C., of the formula

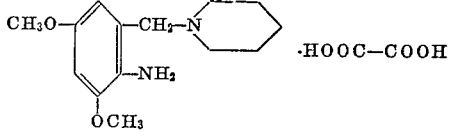

was prepared from N-(2-amino-3,5-dimethoxy-benzyl)-piperidine, a non-distillable oil. The yield was 31% of theory.

EXAMPLE 37

Using a procedure analogous to that described in Example 6, N-(2-amino-3,5-dimethoxy-benzyl)-morpholine oxalate, M.P. 153–154° C. (decomposition), of the formula

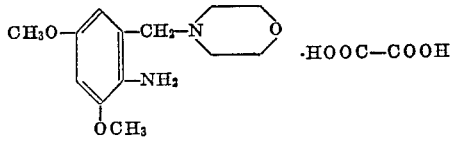

was prepared from N-(2-amino-3,5-dimethoxy-benzoyl)-morpholine (M.P. 112° C.).

EXAMPLE 38

Using a procedure analogous to that described in Example 6, N-(2-amino-4,5-methylenedioxy-benzyl)-piperidine, M.P. 74° C., of the formula

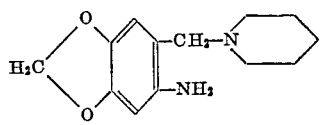

was prepared from N-(2-amino-4,5-methylenedioxy-benzoyl)-piperidine (M.P. 110° C.). The yield was 15% of theory.

The compounds according to the present invention, that is, those embraced by Formula I above and their non-toxic, pharmacologically acceptable acid addition salts, have useful pharmacodynamic properties. More particularly, they exhibit highly effective secretolytic and antitussive properties in warm-blooded animals. By "secretolytic" we mean increasing bronchial secretion.

For pharmaceutical purposes the compounds of the invention are administered to warm-blooded animals perorally or parenterally as active ingredients in customary dosage unit compositions, i.e. compositions in dosage unit form consisting essentially of an inert pharmaceutical carrier and one dosage unit of the active ingredient, such as tablets, coated pills, solutions, suspensions, syrups, suppositories, capsules, wafers and the like. One dosage unit of the compounds of the present invention is from 2 to 200 mgm.

The following examples illustrate a few dosage unit compositions containing a compound according to the invention as an active ingredient. The parts are parts by weight unless otherwise specified.

EXAMPLE 39

Syrup

The syrup is compounded from the following ingredients:

| | Parts |
|---|---|
| N-(2 - amino-4,5 - methylenedioxybenzyl)methylamine | 0.04 |
| Tartaric acid | 0.5 |
| Ammonium chloride | 0.4 |
| Benzoic acid | 0.2 |
| Sugar | 65.0 |
| Sodium pyrosulfite | 0.1 |
| Essence of ginger | 0.2 |
| Certified food colors | 0.002 |
| Ethanol | 10.0 |
| Distilled water (by volume) q.s.ad | 100.0 |

Compounding procedure.—The distilled water is heated to 80° C., and then the benzoic acid, the tartaric acid, the ammonium chloride, the methylamine compound, the food color and the sugar are dissolved therein. The resulting syrup is subsequently cooled to room temperature, the sodium pyrosulfite is dissolved therein, and then a mixture of the essence of ginger and the ethanol is added thereto. The finished syrup is finally filtered. 10 cc. of syrup contain 4 mgm. of the active ingredient.

EXAMPLE 40

Hypodermic solution

The solution is compounded from the following ingredients:

| | Parts |
|---|---|
| N-(2-amino - 4,5 - methylenedioxybenzyl) - isopropylamine | 4.0 |
| Sodium chloride | 15.0 |
| Sodium pyrosulfite | 2.0 |
| 0.1 N hydrochloric acid ad pH 4.0, q.s. | |
| Distilled water (by volume) q.s.ad | 2000.0 |

Compounding procedure.—While heating some of the distilled water gently, the isopropylamine compound is stirred into the water, and then 0.1 N hydrochloric acid is added to the aqueous mixture until the pH is 4.0, whereby the isopropylamine compound goes into solution. Thereafter, the sodium pyrosulfite and the sodium chloride are dissolved in the acidic aqueous solution, the required amount of additional distilled water is added, and the solution is filtered until free from suspended particles. The finished solution is filled into white 2 cc.-ampules in an atmosphere of an inert gas, and the filled ampules are sterilized for twenty minutes at 120° C. and sealed. Each ampule contains 4 mgm. of the active ingredient.

EXAMPLE 41

Tablets

The tablet composition is compounded from the following ingredients:

| | Parts |
|---|---|
| N-(2-amino - 4,5 - methylenedioxybenzyl)-morpholine | 4.0 |
| Lactose | 60.0 |
| Potato starch | 41.0 |
| Polyvinylpyrrolidone | 4.0 |
| Magnesium stearate | 1.0 |
| Total | 110.0 |

Compounding procedure.—The morpholine compound is thoroughly admixed with the lactose and the potato starch, the resulting mixture is moistened with an aqueous 20% solution of the polyvinylpyrrolidone, and the moist mixture is forced through a 1 mm.-mesh screen. The moist granulate obtained thereby is dried at 40° C., again passed through the screen, and finally admixed with the magnesium stearate. The mixture is then pressed into 110 mgm.-tablets. Each tablet contains 4 mgm. of the active ingredient.

Although the above dosage unit composition examples illustrate the use of only three specific compounds of the invention as active ingredients, it should be understood that any of the other compounds embraced by Formula I above or a non-toxic acid addition salt thereof may be substituted for the particular active ingredient illustrated in Examples 39 through 41. Moreover, the amount of the active ingredient in any of these examples may be varied within the dosage unit limits set forth above, and the amounts and nature of the pharmaceutical carrier ingredients may be varied to meet particular requirements.

While the present invention has been illustrated with the aid of specific embodiments thereof, it will be readily apparent to others skilled in the art that the invention is not limited to these particular embodiments and that various changes and modifications may be made without departing from the spirit of the invention or the scope of the appended claims.

We claim:
1. A compound of the formula

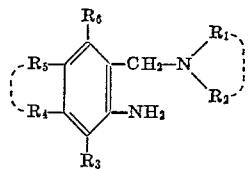

wherein:
$R_1$ is alkyl of 1 to 2 carbon atoms or β-methoxy-ethyl,
$R_2$ is hydrogen, alkyl of 1 to 4 carbon atoms or cyclohexyl,
$R_1$ and $R_2$, together with each other and the nitrogen atom to which they are attached, are pyrrolidino, morpholino, piperidino or N'-methylpiperazino,
$R_3$ and $R_4$ are hydrogen or methoxy,
$R_5$ is methoxy,
$R_4$ and $R_5$, together with each other, are methylenedioxy, and
$R_6$ is hydrogen or methoxy,
provided that at least one and no more than two of $R_3$, $R_4$ and $R_6$ are methoxy, or a non-toxic, pharmacologically acceptable acid addition salt thereof.

2. N-(2-amino-4,5-methylenedioxy-benzyl)-methylamine.
3. N-(2-amino-4,5-methylenedioxy-benzyl)-isopropylamine.
4. N-(2-amino-4,5-methylenedioxy-benzyl)-morpholine.
5. N-(2-amino-4,5-methylenedioxy-benzyl)-dimethylamine.

References Cited

UNITED STATES PATENTS

| | | | |
|---|---|---|---|
| 1,915,334 | 6/1933 | Salzberg et al. | 260—243 |
| 2,075,359 | 3/1937 | Salzberg et al. | 167—22 |
| 2,362,614 | 11/1944 | Calva | 167—22 |
| 3,336,308 | 8/1967 | Keck | 260—247.5 |

OTHER REFERENCES

A. McCoubrey, Chemical Abstracts, vol. 46, pp. 9068–69, (1952).

ALEX MAZEL, *Primary Examiner.*

JOSE TOVAR, *Assistant Examiner.*

U.S. Cl. X.R.

260—340.5, 570.9, 326.5, 294.7, 268, 247.2, 294, 326.3, 253; 424—330, 74, 267, 250, 248

PO-1050
(5/69)

UNITED STATES PATENT OFFICE
CERTIFICATE OF CORRECTION

Patent No. 3,448,106     Dated June 3, 1969

Inventor(s) Josef Nickl, Johannes Keck, and Robert Engelhorn

It is certified that error appears in the above-identified patent and that said Letters Patent are hereby corrected as shown below:

Column 4, line 30, in formula "$HC_2$" should read --$H_2C$--.

Column 9, line 47, "-n-" should read -- -N- --.

SIGNED AND
SEALED

SEP 30 1969

(SEAL)
Attest:

Edward M. Fletcher, Jr.
Attesting Officer

WILLIAM E. SCHUYLER, JR.
Commissioner of Patents